United States Patent Office 3,478,094
Patented Nov. 11, 1969

3,478,094
THERMAL STABILIZATION OF ALIPHATIC
SULPHONYL HALIDES
Jennings P. Blackwell, Bartlesville, Okla., assignor to Phillips Petroleum Company, a corporation of Delaware
No Drawing. Original application Oct. 1, 1962, Ser. No. 227,598, now Patent No. 3,238,255, dated Mar. 1, 1966. Divided and this application Oct. 18, 1965, Ser. No. 513,880
Int. Cl. C07c *143/70*
U.S. Cl. 260—543                                           11 Claims

ABSTRACT OF THE DISCLOSURE

Hydrocarbon sulphonyl halides having up to 18 carbon atoms are thermally stabilized by the addition thereto of a compound selected from the group consisting of phenylhydroquinone, p-tert-butyl catechol, nitrobenzene, anthraquinone, dinitrocresol, dinitromesitylene, Rose Bengal and sodium sulfite.

---

This application is a division of copending application Ser. No. 227,598, filed Oct. 1, 1962, now U.S. Patent 3,238,255.

This invention relates to hydrocarbon sulphonyl halides, especially sulphonyl chlorides and fluorides of alkanes and cycloalkanes. In accordance with one aspect, this invention relates to the preparation of hydrocarbon sulphonyl halides in the presence of an adjuvant. In accordance with another aspect, this invention relates to the stabilization of hydrocarbon sulphonyl halides, especially sulphonyl chlorides.

The sulfochlorination of various hydrocarbons by simultaneous reaction with sulfur dioxide and a halogen such as chlorine in the presence of ultra-violet light is known. Briefly, the process comprises contacting a particular hydrocarbon with these reactants under ultraviolet irradiation, thus forming sulphonyl chlorides of the particular hydrocarbon. One problem which arises in the production of sulphonyl halides of cycloalkanes such as cyclohexane-sulphonyl chloride is that the reaction does not produce 100 percent yields of the desired material, thus the desired product must be separated from unreacted materials and by-products. However, such materials decompose at elevated temperatures yielding, for example, chlorocyclohexane and sulfur dioxide. Thus, such decomposition makes it extremely difficult to recover the desired product by distillation, even when extremely low pressures are employed in the distillation zone.

Also, in the sulfochlorination of relatively low molecular weight saturated hydrocarbons, such as the alkanes, high and low reaction temperature limitations are encountered which limit the flexibility of the reaction. High temperatures are avoided since these cause acceleration of the competing chlorination reaction. Conversely, low temperatures do not allow one to obtain a significant reaction rate. Thus, in order to carry out the reaction satisfactorily, reaction diluents or solvents are necessary but such use generally decreases the efficiency of the reaction especially in view of the fact that most of the reaction diluents are not good solvents for sulfur dioxide.

According to the invention an improved sulfochlorination process is provided whereby the reaction can be carried out in the presence of any inert reaction medium in an improved manner and also whereby the separation and recovery of readily decomposable sulphonyl halides is facilitated, and decomposition is less than that normally occurring.

Accordingly, an object of this invention is to provide an improved process for the sulfochlorination of hydrocarbons in the presence of an inert diluent.

Another object of this invention is to provide an improved process for the preparation of sulphonyl halides of alkanes and cycloalkanes.

A further object of this invention is to stabilize hydrocarbon sulphonyl halides against thermal decomposition.

Other objects and aspects as well as the several advantages of the invention will be apparent to those skilled in the art on further consideration of the specification and the appended claims.

Broadly, according to the invention an improved process is provided for the preparation of hydrocarbon sulphonyl halides whereby the reaction of selected hydrocarbons with $SO_2$ and a halogen is carried out in the presence of ultraviolet light in a diluent containing a cyclic ketone reaction adjuvant. More specifically, it has been found that low molecular weight alkanes can be sulfochlorinated more readily than heretofore possible by carrying out the reaction in the presence of an inert diluent containing from 0.1 to 5 weight percent of a saturated cyclic ketone, such as camphor, containing from 5 to 18 carbon atoms per molecule.

Also, according to the invention, it has been found that decomposition of readily decomposable hydrocarbon sulphonyl halides, especially cycloalkane-sulphonyl chlorides can be minimized at elevated temperature by adding thereto a stabilizing amount of a compound selected from phenylhydroquinone, p-tert-butylcatechol, nitrobenzene, anthraquinone, dinitrocresol, dinitromesitylene, Rose Bengal and sodium sulfite.

The invention also provides a process for the production of novel trans-cycloalkanedi(sulphonyl halides) which comprises contacting a cycloalkane such as cyclopentane with $SO_2$ and chlorine in the presence of ultraviolet light having wave lengths ranging from 2900 to 5000 angstrom units to form trans-cyclopentane-1,3-di sulphonyl chloride). As a further embodiment of this invention the novel trans-cyclopentane-1,3-di(sulphonyl chloride) can be converted to the novel compound trans-cyclopentane-1,3-di(sulphonyl fluoride) by reaction with an alkali metal fluoride such as KF.

Hydrocarbon reactants that can be sulfohalogenated according to the invention include both the alkane and cycloalkane hydrocarbons. Both straight and branched chain alkanes can be used. Suitable hydrocarbons of this type are methane, ethane, propane, n-butane, isobutane, n-pentane, isopentane, hexanes, octanes, nonanes, decanes, octadecanes, cetanes, and the like. Another class of useful hydrocarbons are the saturated alicyclic hydrocarbons of which cyclopentane, cyclohexane, ethylcyclohexane, dodecylcyclohexane, cycloheptane, cyclooctane, menthane, camphane, pinane, naphthenes, decahydronaphthalene, etc., are illustrative.

Reaction adjuvants that can be employed according to the invention include the saturated cyclic ketones having from 5 to 18 carbon atoms per molecule. Representative examples of suitable cyclic ketones that can be employed include, cyclopentanone, cyclohexanone, cyclooctanone, cyclodecanone, cyclododecanone, cyclotetradecanone, cyclohexadecanone, cyclooctadecanone, d,l - menthone, carvomenthone, thujone, isothujone, carone, pinocarvone, camphorquinone, fenchocamphorone, camphor, fenchone, isofenchone, tetrahydroeucarvone, methyl-norcamphor, and the like.

The amount of cyclic ketone ajuvant employed will generally range from 0.1 to about 5 weight percent based on the inert reaction diluent or solvent being employed, preferably from 0.5 to about 3 weight percent on the same basis.

The sulfochlorination reaction can be carried out either batchwise or continuously over a wide range of reaction conditions. The reaction is generally carried out at a temperature below 100° C. and preferably less than about 80° C. Higher temperatures favor the chlorination reaction, so it is preferred to operate below the boiling point of the reactant hydrocarbon to avoid the use of pressure equipment and to avoid the chlorination reaction as much as possible. A more preferred temperature range is from −10 to about 30° C. The pressure ordinarily employed is autogeneous pressure developed by the reaction mixture at the reaction temperature in a closed vessel. The ultraviolet light used for irradiating the reaction mixture will ordinarily have wave lengths measuring from about 2900 angstrom units to about 5000 angstrom units. Wave lengths lower than 2900 angstrom units generally cause the formation of undesirable polymeric materials, and this is, of course, to be avoided. Such light can be conveniently obtained by filtering the light from a conventional UV lamp through Pyrex glass. The $SO_2/Cl_2$ mole ratio employed will ordinarily range from 0.5/1 to 2/1, preferably above 1/1. The mole ratio of the $SO_2$ and $Cl_2$ mixture to the reactant hydrocarbon will generally range from 0.5/1 to 2.5/1, preferably at least 1.5/1.

As indicated above it is preferable to carry out the reaction in the presence of an inert reaction diluent or solvent although the reaction can be conducted in the absence of added solvent. However, depending upon the particular hydrocarbon reactant being sulfochlorinated, the utilization of a secondary solvent or diluent is not necessary since the reactant hydrocarbon itself can serve as the solvent or reaction medium when no additional solvent is charged. For example, the sulfochlorination of cyclopentans can be advantageously carried out using cyclopentane as the reaction medium. If a secondary solvent is to be used a material which is non-reactive in the sulfochlorination reaction should be employed. Typical solvents include the halogenated hydrocarbons such as carbon tetrachloride, chloroform, hexachloroethane as well as other hydrocarbons such as benzene, etc.

Various operative procedures can be employed in carrying out the process of the invention. However, it is ordinarily preferred to charge inert diluent and adjuvant to a reaction zone prior to introduction of the reactants. The sulfur dioxide can then be charged to the reaction zone containing diluent and adjuvant until the maximum amount of $SO_2$ which it is possible to dissolve has been charged to the reactor. The hydrocarbon reactant and chlorine can then be fed into the reaction mixture while irradiating with ultraviolet light. Alternatively, the hydrocarbon reactant, chlorine and $SO_2$ can all be fed simultaneously into the inert diluent-adjuvant mixture.

It has also been found according to the invention that hydrocarbon sulphonyl halides, especially cycloalkanesulphonyl chlorides such as cyclohexanesulphonyl chloride can be substantially prevented from decomposing at elevated temperatures, thus enabling one to distill this material from mixtures containing same by the addition thereto of a stabilizer selected from phenylhydroquinone, p-tert-butyl catechol, nitrobenzene, anthraquinone, dinitrocresol, dinitromesitylene, Rose Bengal, and sodium sulfite.

In utilizing the stabilizers of the invention, one or more of the above enumerated stabilizing compounds can be added to a hydrocarbon sulphonyl halide or reaction mixture containing same in an amount ranging from 0.2 to 1.0 weight percent based on the sulphonyl halide. Amounts of stabilizer ranging from 0.25 to 0.6 weight percent on the same basis are preferred. As will be shown in the specific examples the stabilizers of the invention are effective in preventing the decomposition of sulphonyl halides at temperatures ranging as high as 150° C.

As indicated above the stabilizer can be added to a refined sulphonyl halide or can be added to crude reaction mixtures containing same. In actual operation the resulting stabilizer-containing mixture can be subjected to fractional distillation conditions in a suitable distillation apparatus wherein the hydrocarbon sulphonyl halide is recovered as a substantially pure product.

Without any intent to limit the invention thereby it is theorized that the stabilizers of the invention work differently than stabilizers for other materials such as polysulphone resins. When a polysulphone resin decomposes, this is a mere evolution of sulfur dioxide which is usually thermally induced. When cycloalkanesulphonyl chloride decomposes, it is also initiated thermally, but the decomposition apparently proceeds by a free radical mechanism. Based on this evidence, it can be stated that the stabilizers apparently do not act merely as an acid acceptor, thus preventing excess acid from building up and catalyzing further decomposition, but rather act as chain terminators or free radical acceptors. Thus, the stabilizers of the invention function to thermally stabilize the pure components when added thereto during subsequent handling and storage and can be added to reaction mixtures containing same so as to facilitate distillation of the reaction mixture to recover the desired sulphonyl halide product.

It is also possible according to the invention to produce novel trans-cyclopentanesulphonyl chlorides and fluorides by the simultaneous reaction of cyclopentane with sulfur dioxide and chlorine under UV irradiation. The reaction can be conveniently carried out by charging cyclopentane and a secondary solvent (if used) to a suitable reaction zone and thereafter bubbling the $SO_2$ and chlorine into the liquid cyclopentane. The addition of the gases will continue throughout the reaction period with the reaction time generally ranging from a few minutes to 50 hours, preferably above 5 hours. At the longer reaction times the conversion of the desired cyclopentane 1,3-di(sulphonyl chloride) will be the highest. As shown in the specific examples the cis-isomer of this material is not formed during the sulfochlorination reaction. The reaction mixture is subjected to UV irradiation having wave lengths ranging from 2900 to 5000 angstrom units. Suitable secondary solvents that can be employed when desired include carbon tetrachloride, chloroform, hexachloroethane, and the like.

As a further embodiment of this invention the novel trans-cyclopentane 1,3-di(sulphonyl chloride) formed above can be converted to the novel compound trans-cyclopentane 1,3-di(sulphonyl fluoride) by reaction with a water-soluble metal fluoride such as KF. This reaction is carried out by contacting the disulphonyl chloride with KF at a temperature ranging generally from about 90 to about 100° C. It is generally preferred to employ a small of water thus forming a hot saturated solution of KF at the reaction conditions. The amount of KF employed is generally at least 2 mols per mol of the disulphonyl chloride and it is preferable to employ an excess as for example 5 to 10 mols of KF per mole of the chloride. Other fluorinating agents capable of replacing chlorine atoms with fluorine can be substituted in place of potassium fluoride. Suitable additional fluorides include sodium, silver and antimony fluorides.

The sulphonyl halides obtained according to the invention described herein are useful for preparing a wide variety of derivatives for which purpose the crude reaction mixture or the purified individual sulfonyl halides can be employed. The mixed or pure sulfonyl chlorides for example, can be hydrolysed to sulfonic acids by heating with water or aqueous mineral acids, or converted to salts of such sulfonic acids by digestion with appropriately selected bases. By reaction with alcohols, either or alone or in the presence of alkali metals or organic or inorganic bases, the cycloalkane sulphonyl chlorides, for example, yield esters which are useful as palsticizers for cellulose derivatives and resins. Moreover, the sulphonyl halides obtained are useful as intermediates in the preparation of polysulphones and sulphonamides.

A better understanding of the invention will be obtained upon reference to the following illustrative examples which are not intended, however, to be unduly limitative of the invention.

EXAMPLE I

A mixture comprising 800 cc. of carbon tetrachloride, 12 grams of camphor and 130 grams of sulfur dioxide was irradiated with light from an ultraviolet lamp which passed through a quartz thimble and a Pyrex filter to screen out ultraviolet below 2900 angstroms. Ethane and chlorine were pressured into this reaction media from cylinders, and a 20 percent conversion of chlorine to ethanesulfonyl chloride was obtained. In a similar run without added camphor, only a trace of the sulfonyl chloride was obtained. In this run without camphor, a very high degree of chlorination of the ethane occurred.

The above run clearly indicates that the use of camphor greatly increases the yield of chlorosulfonated hydrocarbon and avoids high chlorination reaction rates.

EXAMPLE II

In one run, a reaction mixture containing cyclohexanesulfonyl chloride was charged to a laboratory distillation column and subjected to vacuum distillation. The column used was a 24" glass-packed column using a 2/1 reflux ratio. Numerous small fractionation cuts were taken which contained from 75 percent (refractive index 1.4853) to 91 percent (refractive index 1.4949) cyclohexanesulfonyl chloride. Only the last cut contained a significant amount of cyclohexanesulfonyl chloride. This last cut amounted to 32 grams having a refractive index of 1.4968. This cut analysed 94.2 percent cyclohexanesulfonyl chloride.

A second sample of the same reaction mixture was mixed with approximately 0.3 weight percent phenylhydroquinone and distilled through the same column at the same conditions. The second cut taken overhead amounted to 108 grams having a refractive index of 1.4960. This material analyzed 95.2 percent cyclohexanesulfonyl chloride. In addition, the pressure increase noted during the distillation without any stabilizer being present did not occur during distillation of the stabilizer-containing mixture.

A similar run indicated that approximately 0.1 weight percent phenylhydroquinone was insufficient to stabilize the material for distillation.

In still another run, approximately 0.3 weight percent p-tert-butyl catechol was found to satisfactorily stabilize cyclohexanesulphonyl chloride for distillation.

EXAMPLE III

In a further series of runs, cyclohexanesulphonyl chloride was mixed with approximately 0.5 percent by weight of various compounds, after which the resulting mixtures were heated to approximately 150° C. and maintained at this temperautre for 2 hours. The degree of stabilization was determined by checking the decrease in refractive index during the 2-hour period. The greater decrease in refractive index is indicative of increased decomposition. The results of these tests are expressed below as Table I.

TABLE I

| Additive | RI at start | RI after 2 hours at 150° C. | Decrease in RI |
|---|---|---|---|
| None | 1.4946 | 1.4826 | .0120 |
| Nitrobenzene | 1.4955 | 1.4910 | .0045 |
| Anthraquinone | 1.4898 | 1.4815 | .0083 |
| Dinitrocresol | 1.4898 | 1.4825 | .0073 |
| Dinitromesitylene | 1.4885 | 1.4800 | .0085 |
| Rose Bengal | 1.4873 | 1.4792 | .0081 |
| Sodium sulfite | 1.4965 | 1.4885 | .0080 |

EXAMPLE IV

Several runs were carried out in which cyclopentane was sulfochlorinated by simultaneous reaction with $SO_2$ and $Cl_2$ under ultraviolet irradiation.

In each of the runs, the desired amount of cyclopentane was charged to either a 12-liter or a 500 ml. reaction flask irradiated with a 450-watt or a 100-watt Hanovia bulb respectively, shining through a Pyrex glass sleeve. Since Pyrex absorbs light below 2900° A., the light used had a wave length of approximately 2900–5000° A. The reaction was carried out by bubbling $SO_2$ and $Cl_2$ into the cyclopentane at the stated reaction conditions for the desired period of time. During the reaction, the desired temperature was maintained by the use of ice water circulating in a cooling coil. The results of these runs are expressed below as Table I.

TABLE I

| Run No. | 1 [3] | 2 | 3 |
|---|---|---|---|
| Irradiation times, hours | 18.5 | 6.5 | 7.0 |
| Temperature, ° F. | 80–90 | 100–105 | 100 |
| Cyclopentane charge, grams | 7450 | 261 | 261 |
| $SO_2$ input, grams | 3850 | 350 | 300 |
| $Cl_2$ input, grams | 3420 | 500 | 200 |
| $SO_2/Cl_2$ mol ratio | 1.25 | 0.77 | 1.66 |
| Rate of $Cl_2$ input, grams/hour | 185 | 77 | 29 |
| Total weight of reaction mixture, grams | 10,485 | 572 | 431.5 |
| Analysis of reaction mixture by fractional distillation and analysis of the distillates | | | |
| Unreacted cyclopentane (percent) | [1] 32.4 | 5.9 | 15.3 |
| Loss in distillation (percent) | 9.4 | 25.7 | 8.2 |
| Chlorocyclopentane (percent) | 8.3 | 17.5 | 4.2 |
| Cyclopentane sulphonyl chloride (percent) | 41.1 | 33.2 | 61.2 |
| Residue after product distillation (percent) | 8.8 | 17.7 | 11.1 |
| Conversion to monosulphonyl chloride of— | | | |
| Chlorine | 53.0 | 30.4 | 55.7 |
| Cyclopentane | 24.1 | 30.4 | 42.2 |
| Conversion to disulphonyl chloride of—[2] | | | |
| Chlorine | 14.3 | 10.2 | 12.8 |
| Cyclopentane | 3.3 | 10.2 | 4.8 |
| Conversion to chlorocyclopentane of— | | | |
| Chlorine | 17.3 | 25.8 | 6.6 |
| Cyclopentane | 7.8 | 25.8 | 4.0 |

[1] Based on distillation and titration with standard sodium methoxide.
[2] Calculated by assuming the residue after distillation to be mixtures of cyclopentane disulphonyl chlorides.
[3] Run 1 made in 12-liter reaction flask, Runs 2 and 3 in a 500-ml. flask The residue remaining from the distillation of Run 3 was treated with excess ether. After stripping off the ether, the residue was dissolved in 1 part $CCl_4$:2 parts ether, and on cooling, a solid crystallized from the solution. The melt range of this solid was 60–65° C. This material was found to be cyclopentane disulfonyl chloride.

To further confirm this reaction, 258.3 grams of the cyclopentane sulfonyl chloride from the distillation of Run 1 was charged to a 500 ml. flask along with 160 cc. of $CCl_4$. After charging, 330 grams of $SO_2$ and 190 grams of $Cl_2$ were bubbled through the mixture for 6.5 hours at 100° F. and atmospheric pressure while irradiating the mixture with a 100-watt Hanovia bulb (through a Pyrex sleeve). After the solvent was stripped off, the residue was dissolved in a mixture of $CCl_4$ and ether. When this solution was cooled, a solid crystallized out, M.P. 60–65° C. When mixed with the solid from Run 3 residue above, there was no depression in melting point. After repeated crystallizations from a mixture of chloroform and n-pentane, the melt point was 65° C. This solid was then subjected to elemental analysis. The results were as follows:

ELEMENTAL ANALYSIS

| Element | Wt. percent calculated for $C_5H_8Cl_2O_4S_2$ | Found wt. percent |
|---|---|---|
| Carbon | 22.5 | 22.6 |
| Hydrogen | 3.02 | 3.05 |
| Chlorine | 26.5 | 26.5 |
| Sulfur | 24.0 | 23.9 |

Nuclear magnetic resonance showed conclusively that the sulfonyl chloride groups were located in the 1,3 positions while polarized microscopy showed conclusively that the material was the trans isomer. It is apparent from the above data that trans-cyclopentane-1,3-disulfonyl chloride was prepared.

EXAMPLE V

The cyclopentane disulfonyl chloride of Example IV was reacted with KF to form cyclopentane disulfonyl fluoride.

In this run, 121 grams of KF·2H₂O and 10 ml. water were charged to a 300 ml., 3-necked flask fitted with a stirrer and condenser. The mixture was heated to 90–100° C., and 50 grams of cyclopentane disulfonyl chloride was added to the KF mixture over a 45 minute period. The reaction mixture was maintained at 90–100° C. for an additional 105 minutes. The reaction mixture was then cooled, and the solids present were filtered off. The filtrate had an aqueous layer and an oil layer. The solids which were filtered off were extracted three times with about 100 ml. of ether in each extraction. The ether extracts and the oil layer from the filtrate were combined and the mixture was distilled through a 12″ packed column. The dark residue remaining was dissolved in 50 cc. of ether and Norit A (charcoal) was added to the solution. The mixture was heated for 5–10 minutes, filtered hot and cooled. White crystals, M.P. 44–49° C. were obtained. After recrystallization from ether, the crystals had a M.P. of 60–62° C. Further recrystallization from ether yielded a material, M.P. 61–62° C., insoluble in pentane, soluble in hot CCl₄. The material was then subjected to elemental analysis.

ELEMENTAL ANALYSIS

| Element | Calculated for $C_5H_8F_2O_4S_2$, wt. percent | Found wt. percent |
|---|---|---|
| Carbon | 25.6 | 25.7 |
| Hydrogen | 3.4 | 3.7 |
| Sulfur | 27.4 | 27.9 |
| Fluorine | 16.2 | 17.9 |

It is apparent from the above data that trans-cyclopentane-1,3-di(sulfonyl fluoride) was prepared. The novel trans-compounds prepared according to the invention can be converted to esters by alcoholysis. The esters are useful as plasticizers.

It will be evident to those skilled in the art that various modifications of this invention can be made or followed in the light of the foregoing disclosure and discussion without departing from the spirit or scope thereof.

What is claimed is:

1. A process for the formation and recovery of cycloalkanesulphonyl chlorides which comprises reacting at least one cycloalkane hydrocarbon having up to 18 carbon atoms with SO₂ and chlorine in an inert liquid reaction medium comprising at least one halogenated hydrocarbon in the presence of ultraviolet light, adding to the reaction mixture thus formed from 0.2 to 1 weight percent, based on cycloalkane sulphonyl chloride in said reaction mixture, of at least one thermal stabilizer selected from the group consisting of phenylhydroquinone, p-tert-butyl catechol, nitrobenzene, anthraquinone, dinitrocresol, dinitromesitylene, Rose Bengal and sodium sulfite, and thereafter separating cycloalkanesulphonyl chloride by distillation as a product from the stabilizer containing reaction mixture.

2. A process for the preparation and recovery of cyclohexanesulphonyl chloride which comprises the steps of reacting cyclohexane in carbon tetrachloride with SO₂ and chlorine in the presence of ultraviolet light in a reaction zone to form a crude reaction product containing cyclohexanesulphonyl chloride, adding to said crude reaction product from 0.25–0.6 weight percent, based on said sulphonyl chloride, of at least one stabilizer selected from the group consisting of phenylhydroquinone, p-tert-butyl catechol, nitrobenzene, anthraquninone, dinitrocresol, dinitromesitylene, Rose Bengal and sodium sulfite, passing the resulting stabilizer-containing crude product to a frictionation zone, subjecting said crude product to distillation conditions in said latter zone, and recovering from said latter zone cyclohexanesulfphonyl chloride substantially free of other materials as a product of the process.

3. A process of stabilizing at least one saturated hydrocarbon sulphonyl halide having up to 18 carbon atoms against thermal decomposition; which comprises adding to the same as a thermal stabilizing agent at least 0.2 weight percent, based on said saturated hydrocarbon sulphonyl halide, of at least one compound selected from the group consisting of phenylhydroquinone, p-tert-butyl catechol, nitrobenzene, anthraquinone, dinitrocresol, dinitromesitylene, Rose Bengal and sodium sulfite.

4. A process in accordance with claim 3 wherein said saturated hydrocarbon sulphonyl halide is an alkane sulphonyl chloride having up to 18 carbon atoms.

5. A process in accordance with claim 3 wherein said saturated hydrocarbon sulphonyl halide is a saturated alicyclic hydrocarbon sulphonyl chloride having up to 18 carbon atoms.

6. A process in accordance with claim 5 wherein said saturated alicyclic hydrocarbon contains up to 8 carbon atoms in the ring thereof.

7. A process in accordance with claim 3 wherein said saturated hydrocarbon sulphonyl halide is a saturated bicyclic hydrocarbon sulfonyl chloride having up to 10 ring carbon atoms.

8. A process in accordance with claim 3 wherein said saturated hydrocarbon sulphonyl halide is cyclohexane sulphonyl chloride and the quantity of said agent added is in the range of about 0.2 to 1 weight percent based on the cyclohexane sulphonyl chloride.

9. A process in accordance with claim 3 wherein said saturated hydrocarbon sulphonyl halide is trans-cyclopentane-1,3,di(sulphonyl chloride) and the quantity of said agent added is in the range of about 0.2 to 1 weight percent based on the trans-cyclopentane-1,3-di(sulfonyl chloride).

10. A process in accordance with claim 3 further comprising maintaining said stabilizing agent in contact with said saturated hydrocarbon sulphonyl halide for the period of time for which the thermal stabilization is desired.

11. A process in accordance with claim 3 further comprising heating the resultant admixture to a temperature up to about 150° C.

References Cited

UNITED STATES PATENTS 2,174,509  7/1939  Fox _____ 260—543
3,202,707  8/1965  Starks _____ 260—543

JAMES A. PATTEN, Primary Examiner

H. C. WEGNER, Assistant Examiner